United States Patent [19]

Payne et al.

[11] Patent Number: 5,462,332
[45] Date of Patent: Oct. 31, 1995

[54] HIGH STRENGTH VEHICLE RECLINER SEAT

[75] Inventors: Scott T. Payne, Rochester Hills; Gary A. Wize, Shelby Township; James E. Carl, Sterling Heights, all of Mich.

[73] Assignee: General Motors Corporation, Detroit, Mich.

[21] Appl. No.: 316,775

[22] Filed: Oct. 3, 1994

[51] Int. Cl.⁶ ............................................. B60N 2/42
[52] U.S. Cl. .............................. 297/216.1; 297/362.14
[58] Field of Search ..................... 297/216.1, 216.15, 297/216.16, 216.13, 362.14, 362.12, 378.11, 452.18

[56] References Cited

U.S. PATENT DOCUMENTS

| | | | |
|---|---|---|---|
| 2,682,931 | 7/1954 | Young | 188/1 |
| 2,735,476 | 2/1956 | Fieber | 155/9 |
| 2,823,730 | 2/1958 | Lawrence | 155/9 |
| 3,269,774 | 8/1966 | Hildebrandt et al. | 297/386 |
| 3,471,197 | 10/1969 | Ely | 297/385 |
| 3,552,795 | 1/1971 | Perkins et al. | 297/216 |
| 3,578,376 | 5/1971 | Hasegawa et al. | 296/65 |
| 3,734,562 | 5/1973 | Fourrey | 297/216 |
| 3,806,190 | 4/1974 | Winslow | 297/216 |
| 3,832,002 | 8/1974 | Eggert, Jr. et al. | 297/216 |
| 3,853,298 | 12/1974 | Libkie et al. | 248/429 |
| 3,957,304 | 5/1976 | Koutsky et al. | 297/385 |
| 4,183,582 | 1/1980 | Taki | 297/464 |
| 4,325,238 | 4/1982 | Scherbing | 70/18 |
| 4,349,167 | 9/1982 | Reilly | 244/122 R |
| 4,390,208 | 6/1983 | Widmer et al. | 297/379 |
| 4,488,754 | 12/1984 | Heesch et al. | 297/216 |
| 4,775,182 | 10/1988 | Von Hoffman | 297/45 |
| 4,824,171 | 4/1989 | Hollingsworth | 297/351 |
| 5,306,073 | 4/1994 | Rees | 297/362.14 |
| 5,318,341 | 6/1994 | Griswold et al. | 297/362.11 |
| 5,320,413 | 6/1994 | Griswold et al. | 297/362.14 X |
| 5,366,268 | 11/1994 | Miller et al. | 297/216.1 |

FOREIGN PATENT DOCUMENTS

0276186A1  7/1988  European Pat. Off. .
3612474A1  1/1988  Germany .

*Primary Examiner*—Kenneth J. Dorner
*Assistant Examiner*—Milton Nelson, Jr.
*Attorney, Agent, or Firm*—Ernest E. Helms

[57] ABSTRACT

A recliner seat for a vehicle is provided including a bun frame; a seat back frame pivotally mounted with respect to the bun frame; a rotatable drive screw with a first end held by a first fixture and a second end held by a second fixture, the first and second fixtures being normally positionally fixed with respect to the bun frame, the first and second ends of the drive screw being held along a first linear axis intersecting the first and second fixtures; a third fixture generally fixed with respect to the bun frame; a nut threadably encircling the drive screw and moved by the drive screw along the first linear axis; and a link pivotally connected with respect to the seat back frame and the nut. Thus, upon loading on the seat back frame exceeding a predetermined amount, the nut moves to a position nonaligned with the first linear axis to contact the third fixture to retard angular movement of the seat back.

5 Claims, 2 Drawing Sheets

HIGH STRENGTH VEHICLE RECLINER SEAT

FIELD OF THE INVENTION

The field of the present invention is that of vehicle seats, particularly vehicle seats in the forward row of a multiple-seating-row vehicle.

BACKGROUND OF THE INVENTION

Most of the design constraints associated with vehicle seating are primarily concerned with preventing the vehicle seat from going forward in a frontal impact crash. However, sometimes it is desirable to prevent the front row seat back from possibly moving rearwardly. Presently, the main factor preventing rearward or forward movement of the seat back is the structural integrity of the seat. Preventing possible rearward or forward motion of a seat is harder to obtain when utilizing a reclining seat wherein the seat back in normal operation is allowed to adjust inclination rearwardly or forwardly.

SUMMARY OF THE INVENTION

To meet the above-noted challenges, Miller et al U.S. Ser. No. 08/131,247 in a preferred embodiment brought forth a vehicle seat with an auxiliary strut having a fixed pivotal connection with either side of the seat back or the seat bun and a lost motion pivotal connection with the other frame member. In situations where the vehicle encounters a rear impact, the lost motion connection of the Miller et al pivotal attachment is latched, thereby causing both ends of the strut to have a fixed pivotal axis with the seat back and the seat bun, thereby hindering any further rearward motion of the seat back. However, in normal operation, the strut of Miller et al allows movement of the seat back rearwardly with respect to the seat bun with virtually no interference.

The present invention provides an alternative to the seat of Miller et al and is particularly adaptable with linear recliners and allows the utilization of linear recliners in situations where possible force inputs into the seat would have previously disallowed the utilization of linear recliner mechanisms but would have instead required a rotary mechanism which some vehicle seat occupants find objectionable from the standpoint of convenience of operation or packaging efficiency.

DESCRIPTION OF THE PREFERRED EMBODIMENT

Figure 1:
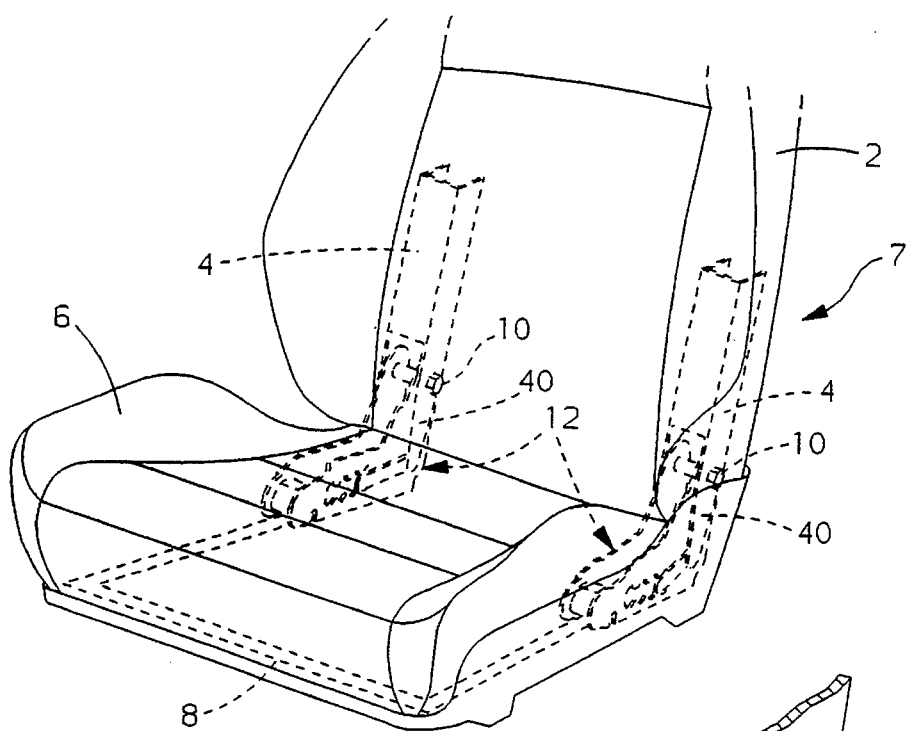
FIG. 1 is a perspective view of a preferred embodiment vehicle recliner seat according to the present invention.
Figure 2:
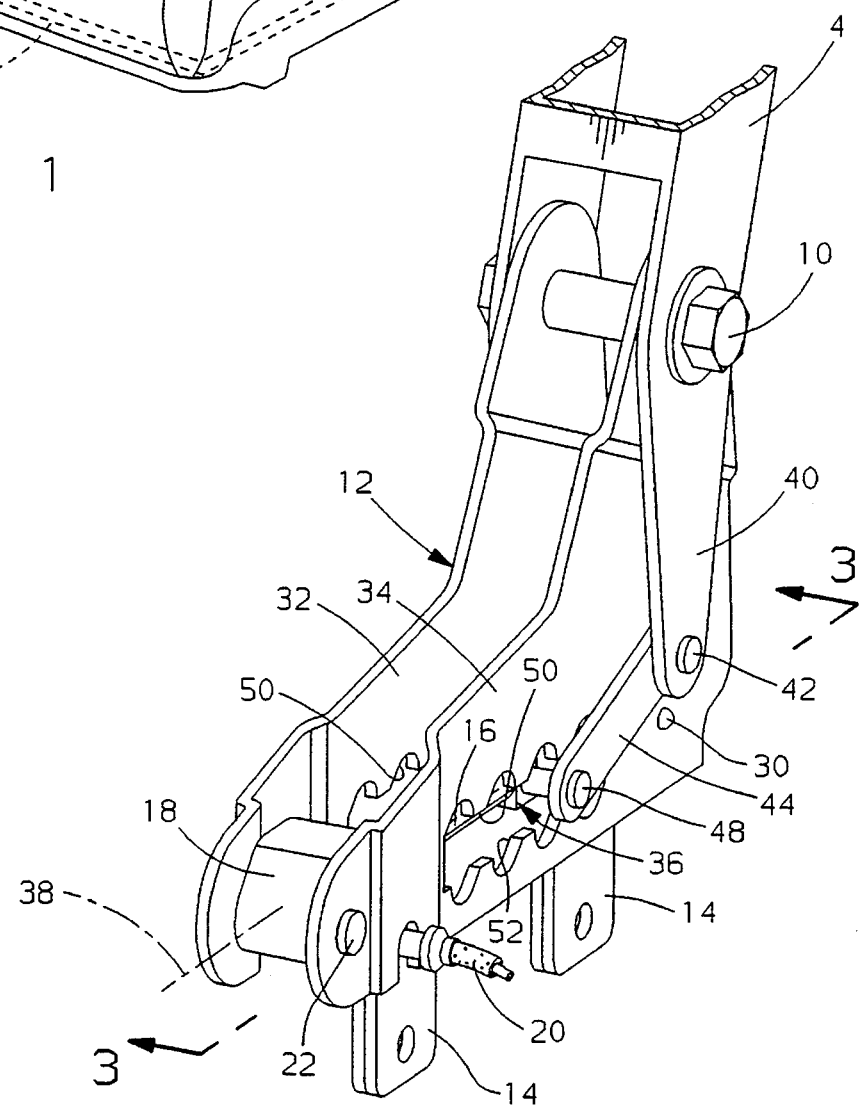
FIG. 2 is an enlarged view of the seat shown in FIG. 1 with major portions of the seat removed for clarity of illustration along with the surrounding padding materials.

Referring to FIGS. 1 through 4, a preferred embodiment seat 7 according to the present invention is provided. The seat 7 has a second member seat back 2 which includes a generally inverted U-shaped seat back frame 4. The seat back frame 4 is pivotally connected with respect to a frame 8 of bun 6 along a fixed pivotal axis by pins 10 via a parallel-sided bracket 12.

As mentioned previously, bracket 12 is fixed with respect to the seat bun frame 8 and is typically attached via fasteners (not shown) by two downwardly projecting arms 14 to the remainder of the bun frame 8. To effect pivotal motion of the seat back 2, there is a drive screw 16. The drive screw 16 is powered by a gear drive 18 powered by a rotational cable 20. The gear drive 18 has a pivotal connection with the bracket 12 via a pin 22. The gear drive 18 provides a first positionally fixed holding fixture for a first end 24 of the drive screw. A relatively stiff, hard polymeric block 26 provides a second positionally fixed fixture for holding a second end 28 of the drive screw. A pin 30 connects the block 26 to the opposing sides 32, 34 of the bracket.

Threadably encircling the drive screw is a nut 36. The nut on either side has horizontally projecting pins 48. The nut 36 travels along a first linear axis 38 of the drive screw 16 which extends between the rotary driver 18 and the block 26.

Below pin 10, an extension 40 of the seat back frame is pivotally connected by a pin 42 to links 44. The links 44 are in turn pivotally connected to the pins 48.

The plates 32 and 34 of the bracket 12 both have a third fixture saw tooth surface 50. To selectively change the inclination of the seat back 2 during normal operation, the gear drive 18 is powered by a motor (not shown) to actuate the cable 20 to rotate the drive screw 16. By entrapment between the two plates 32 and 34 or by other suitable nonrotative features, the block 36 cannot rotate about shaft 16 and is therefore translated, pulling or pushing on link 44, thereby moving the seat back 2. It will be obvious to those familiar with the art that the translation of the block will be along the first linear axis 38.

Figure 3:
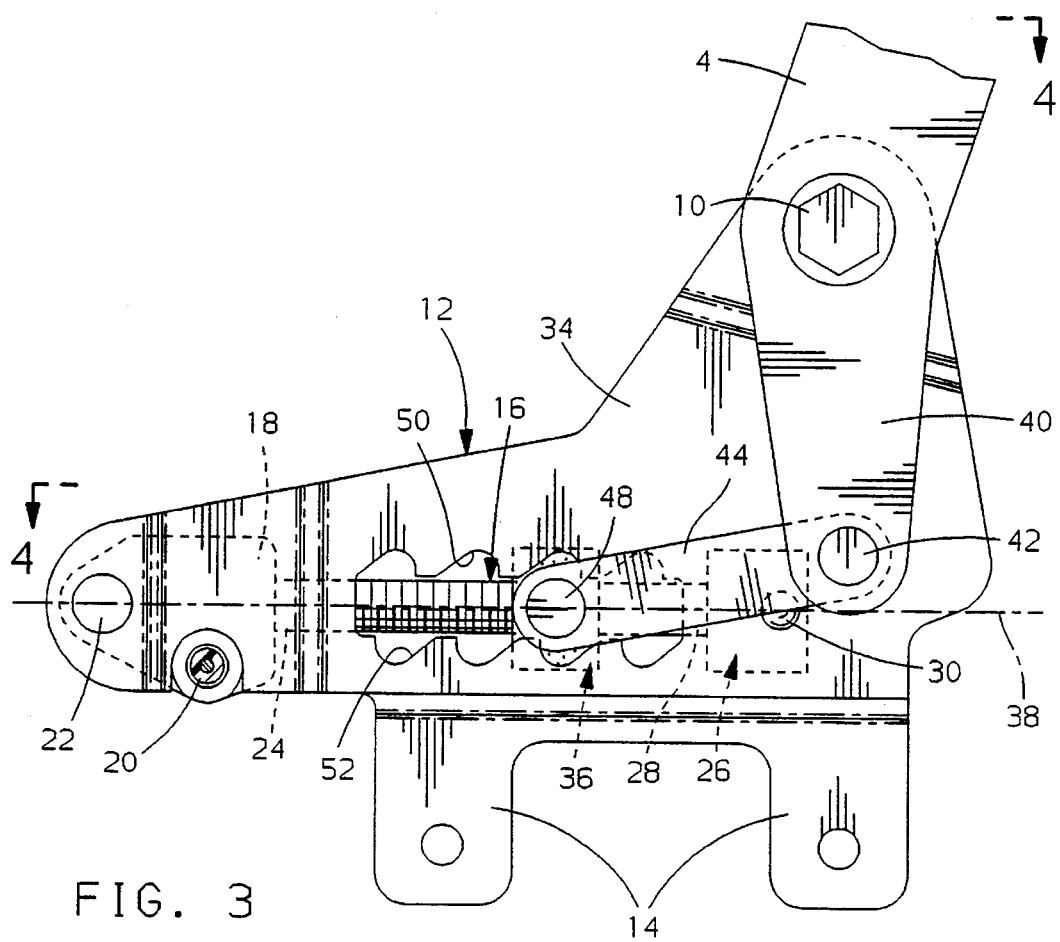
FIG. 3 is a view taken along line 3—3 of FIG. 2.
Figure 4:
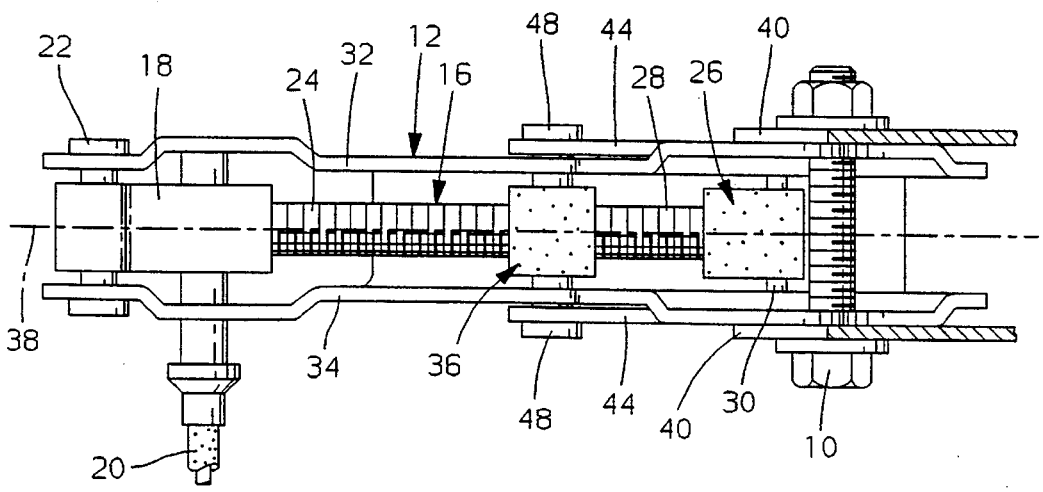
FIG. 4 is a view taken along line 4—4 of FIG. 3.

In a situation of excessive loading on the seat back (typically due to occupant or restraint belt loading in an accident situation), the seat back frame 4 will tend to pivot as shown in FIG. 3 in a clockwise direction. If the loading force exceeds a predetermined level, the block 36 will suffer a deformation in its position with respect to the linear axis 38. Typically, this will best be achieved by allowing deformation in the block 26, which is typically fabricated from a nylon/Delrin material. Deformation in the position of block 36 will most probably be allowed by shearing of pin 30 if desired or a combination of the same with additional deformation in the actual shape of the drive screw 16. Deformation at the front end 24 of the drive screw is largely eliminated due to the pivotal nature of the driver 18 with the bracket 12.

Upon the breaking away or rising of end 28 due to the deformation of block 26, the pins 48 will lock into the saw tooth surface 50 (in a frontal crash situation), thereby retarding any further forward angular movement of the seat back frame 4. Additionally, there is a saw tooth pattern 52 to catch the pin 48 in a rear ending situation wherein the vehicle is struck from behind and the seat back frame 4 is loaded to move angularly rearwardly by reaction of a seat occupant against seat back 2.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A recliner seat for a vehicle comprising:

a first frame member providing a bun frame;

a second frame member providing a seat back frame pivotally mounted with respect to the first frame member;

a rotatable drive screw having a first end held by a first fixture and a second end held by a second fixture, the first and second fixtures being normally positionally fixed with respect to the first frame member, the first and second ends of the drive screw being held along a first linear axis intersecting the first and second fixtures;

a third fixture generally fixed with respect to the first frame member;

a nut threadably encircling the drive screw and moved by the drive screw along the first linear axis; and a link pivotally connected with respect to the second frame member and the nut wherein upon loading on the second frame member exceeding a predetermined amount causes the nut to move to a position nonaligned with the first linear axis to contact the third fixture to retard angular movement of the seat back.

2. A recliner seat for a vehicle as described in claim 1 wherein, upon movement of the nut to the nonaligned position with respect to the linear axis, the first fixture is pivotal with respect to the first frame member and wherein the change in position of the nut from the position generally aligned with the first linear axis occurs by deformation of the second fixture.

3. A recliner seat for a vehicle as described in claim 2 wherein the second fixture is connected to the first frame member by a pin and the pin severs upon excessive loading of the second frame member.

4. A recliner seat for a vehicle as described in claim 1 wherein the third fixture is saw teeth for engagement with a pin which passes through the nut.

5. A recliner seat for a vehicle comprising:

a first frame member providing a bun frame;

a second frame member providing a seat back pivotally mounted with respect to the first frame member;

a rotatable drive screw having a first end held by a first fixture and a second end held by a second fixture, the first fixture being rotatable with respect to the first frame member and the second end being generally fixed with respect to the first frame member, the first and second fixtures holding the drive screw along a first linear axis;

a nut with a projecting pin, the nut threadably encircling the drive screw and being moved by the drive screw along the first linear axis;

a saw tooth surface fixed with respect to the first frame member; and a link pivotally connected with respect to the second frame member and the nut wherein a loading on the seat back exceeding a predetermined amount causes the link to pull on the pin to move the nut to a position nonaligned with the first linear axis, moving the pin to locking engagement with the saw tooth surface, thereby retarding angular movement of the seat back.

* * * * *